Patented Feb. 6, 1940

2,189,148

UNITED STATES PATENT OFFICE 2,189,148

OPACIFIER

Glenn H. McIntyre, Cleveland Heights, Monroe J. Bahnsen, Lakewood, and Benjamin J. Sweo, Cleveland, Ohio, assignors to Ferro Enamel Corporation, Cleveland, Ohio, a corporation of Ohio No Drawing. Application March 13, 1939, Serial No. 261,660

7 Claims. (Cl. 106—36.2)

This invention relates, as indicated, to opacifiers and more particularly to inorganic opacifiers for use in glass-like material such as porcelain enamels.

Our invention also relates to a porcelain enamel containing such opacifiers.

Within the last decade the inherent reflectance, sometimes referred to as whiteness or opacity, of porcelain enamels has been considerably increased. This increase has generally been occasioned by necessity arising out of new uses for which porcelain enamels have been employed.

In general, the reflectance or opacity of an enamel is related to the thickness at which such enamel is applied. Increased thickness of application is, however, attained by a proportional increase in cost and by other difficulties such as chipping and cracking which, even if the cost were not prohibitive, would still make the use of very thick applications of enamel impractical. The greater covering power required of the enamels while at the same time prohibiting very high weights of application has been required when complicated steel shapes such as refrigerators and washing machine tubs have been enameled.

The prior workers in the art have, therefore, been constantly striving to produce materials which when added to the porcelain enamel as so-called opacifiers increase the covering power, whiteness or reflectance of the enamel without any increase in the weight of application.

To obtain this higher reflectance compounds of antimony were added to raw materials from which the enamel was smelted. Fluorspar, furnishing both calcium and fluorine, was employed as an accessory material along with antimony oxide or sodium met-antimonate. Calcspar was also employed as an accessory material furnishing calcium as being of assistance in imparting opacity to the enamels. Titanium dioxide was also employed and was found to contribute opacity to these antimony-bearing enamels.

The prior workers in the art therefore came to recognize that substantial opacity would be obtained by the combined use in a porcelain enamel glass of an antimony-bearing material such as antimony oxide or sodium met-antimonate with a compound yielding alkaline earth ions and a substance yielding fluorine. The prior workers in the art also realized that this opacity could be further increased by the additional presence of substances yielding titania.

The various porcelain enamels which were made utilizing as opacifiers the combined presence of antimony fluorine and titanium were generally of such formula that they contained from zero to 5 mols of $CaF_2$, from zero to 3½ mols of $TiO_2$, from 1 to 9 mols of alkaline earth oxides (present as CaO, BaO or mixtures of the two) per molecule of antimony oxide present.

The workers in the art desired even more opacity than could be produced by the addition of the constituents above named. It was found, for example, that by increasing the antimony content along with the accessory materials or substances previously mentioned the opacity could be very appreciably increased but that the cost was likewise increased to a point where the enamel was hardly commercial. By the lowering of the titania in the composition (or in some cases omitting it entirely), it was found that while the opacity was reduced the cost was likewise reduced so markedly that it was economically possible to increase the antimony content and thereby obtain commercial enamels of greater opacity than had previously been practical. The porcelain enamels made as a result of this further experimentation showed increased opacity which was dependent upon the ions of the alkaline earths, antimony, titania and fluorine in the glass. Such formulas covered a wide range of compositions, i. e. from zero to 4 mols of $TiO_2$, from 1 to 2¼ mols of $CaF_2$, from zero to 4 mols of alkaline earth oxide per mol of antimony oxide.

At this point it is believed advisable to refer to the theory underlying the action of the named constituents in combination as opacifiers. A. I. Andrews in "Enamels" 1935, first edition, pages 48 to 51, expresses the theory that opacity in these enamels was caused by antimony pentoxide, calcium fluoride and sodium fluoride. This assumption was based on certain X-ray observations which had been made. This attempt at explanation by Andrews seems contrary to what has been demonstrated commercially, namely that the opacity of antimony-bearing enamels is due to the formation in the glass of a complex alkaline earth fluo-oxy-antimonate, having a composition between MO.$Sb_2O_5$ and $MF_2$—$Sb_2F_6$ (the fluorine replacing the oxygen) where M=Ca, Ba or Sr.

According to the latest conceptions of atomic structure such complex antimonates when examined by X-ray would show structures very similar to antimony pentoxide. A study of the X-ray work mentioned by Andrews shows that the workers reported on by him suspected no such complexes and did not attempt to find any, although the enamels which they studied contained both calcium and antimony ions.

The further development in looking toward the achievement of even greater opacities, i. e. covering power or reflectance in enamels, was a further utilization of these above referred to complexes. Best results along the line of increased opacity were obtained by using in the raw batch substances which would yield on smelting of the batch an enamel frit containing as an opacifier a complex alkaline earth-fluo-oxy-antimonate dissolved in a complex alkaline earth compound of titania and zirconia. This complex was found to give excellent opacity and without detrimentally affecting the enamel glass. In other words, these complexes formed in situ in the glass by having the constituents thereof included as constituents of the raw batch which was smelted in the preparation of the frit produced the desired further increase in opacity.

The requirements of the industry increased. In other words, greater amounts of opacity were required and efforts were made to achieve the same in two ways. First, by increasing the amount of the complex forming constituents in the raw batch, and, second, by the employment of other opacifiers as mill additions along with the glass which as smelted contained the above referred to opacifiers.

Difficulty was experienced in connection with the first expedient particularly on account of the refractory nature of the opacifier complexes and their tendency when present in substantial amounts to similarly render refractory the glass matrix in which they were combined. It was found that when an effort was made to increase the complex forming constituents in the raw batch to any appreciable extent that it became virtually impossible to smelt the raw material to form a frit by conventional means and processes.

The second expedient attempted likewise fell short of complete success on account of the inherent limitations on the amount of opacity which may be achieved by such additional opacifiers as tin oxide and zirconium dioxide.

It is a principal object of the present invention, therefore, to provide a solution to this problem of securing even greater increased opacity than is possible by any of the prior art opacifiers or processes.

A further object of our invention is the provision of porcelain enamel which, by virtue of the inclusion therein of the opacifier comprising our invention, has a higher reflectance, i. e. greater covering power or opacity, than any of the enamels of the prior art which have been available.

Other objects of our invention will appear as the description proceeds.

To the accomplishment of the foregoing and related ends, said invention, then, consists of the means hereinafter fully described and particularly pointed out in the claims; the following description setting forth in detail one method and one product exemplifying our invention, such disclosed procedure and product constituting, however, but one of the various applications of the principle of our invention.

Broadly stated, our invention comprises the provision of a porcelain enamel which has a very high degree of opacity or covering power by the inclusion therein of a preformed opacifier which comprises a complex alkaline earth-fluo-oxy-antimonate dissolved in a complex alkaline earth compound of titania and/or zirconia.

More specifically our invention comprises the provision of an opacifier which may either be entirely preformed and then employed as a mill addition or which is partially formed in situ by being included in the raw mix which is smelted in the preparation of the frit and supplemented by additional amounts of the preformed material, which opacifier is of the class consisting of the following compositions:

A. $Sb_2O_5 \cdot TiO_2 \cdot 2CaF_2 \cdot 2\frac{1}{2}CaO \cdot \frac{3}{4}K_2O \cdot \frac{3}{4}ZrO_2$
B. $Sb_2O_5 \cdot TiO_2 \cdot 2CaF_2 \cdot 2\frac{1}{2}CaO \cdot \frac{3}{4}K_2O$
C. $Sb_2O_5 \cdot TiO_2 \cdot 2CaF_2 \cdot 2\frac{1}{2}CaO$ For convenience the compositions above indicated will be hereinafter referred to as opacifiers A to C respectively whether such opacifier is preformed and added to the enamel as a mill addition or whether the opacifier forming constituents are included in the raw mix and smelted along with the frit.

As previously indicated, it is impossible to include any very substantial amounts of any of these opacifiers in the raw mix due to the difficulties which arise in smelting the glass. When a very substantial amount of these opacifiers is added to the smelter charge the glass in the smelter becomes so viscous that it is practically impossible to smelt the same and have the molten glass run freely from the smelter. In order to secure a substantial proportion of these opacifiers in the finished enamel two procedures may be followed. First, a minor amount of the opacifier forming constituents may be included in the raw mix and smelted with the frit. Such minor amount will not sufficiently affect the enamel glass so as to materially interfere with the smelting operation. The remainder of the opacifier is then added as a mill addition from a preformed product made as hereinafter more fully explained. Second, the opacifier forming constituents may be omitted entirely from the raw mix and all of the opacifier added as a mill addition in the form of a finely ground preformed opacifier made by sintering as hereinafter explained.

In preparing these opacifiers for use as a mill addition the raw materials, antimony trioxide or tetraoxide or pentoxide, calcspar, whiting, fluorspar, titania, zirconia and potassium nitrate, are intimately mixed and thoroughly ground together. These are then sintered at a temperature of from 1800° F. to 2200° F. and from 2 to 6 hours. After cooling, the slightly caked mixture is ground so that it will all pass through a 200 mesh screen. The material is then ready for use as an opacifier mill addition to the frit in the preparation of the slip which is then applied to the work in the conventional manner as by dipping or spraying and then fired.

We have found that the above-mentioned opacifiers may be employed in amounts from about 2% to about 20% depending upon the degree of opacity desired and the composition of the glass to which the same are added.

Typical formulas for raw materials which when sintered together in the manner above-identified produce the opacifiers for use in our invention are as follows, it being noted that the letters designating the formulas correspond to the previously given formulas for the end products which are used as opacifiers.

Opacifier A

|   | Per cent |
|---|---|
| Whiting (CaCO$_3$) | 24.5 |
| Fluorspar (CaF$_2$) | 15.2 |
| Titania (TiO$_2$) | 7.9 |
| Antimony oxide (Sb$_2$O$_3$) | 28.5 |
| Potassium nitrate (KNO$_3$) | 14.9 |
| Zirconium oxide (ZrO$_2$) | 9.0 |

Opacifier B

|   | Per cent |
|---|---|
| Whiting (CaCO$_3$) | 26.8 |
| Fluorspar (CaF$_2$) | 16.8 |
| Titania (TiO$_2$) | 8.6 |
| Antimony oxide (Sb$_2$O$_3$) | 31.4 |
| Potassium nitrate (KNO$_3$) | 16.4 |

Opacifier C

|   | Per cent |
|---|---|
| Whiting (CaCO$_3$) | 30.6 |
| Fluorspar (CaF$_2$) | 19.2 |
| Titania (TiO$_2$) | 9.8 |
| Antimony pentoxide (Sb$_2$O$_5$) | 40.5 |

It will be observed that the foregoing opacifiers are characterized by a 1 to 1 molecular ratio between titania and antimony.

The potassium nitrate is employed as the oxidizing agent for Sb$_2$O$_3$, converting the same during the smelting or sintering operation into Sb$_2$O$_5$. It is of course entirely possible in the preparation of our opacifiers to begin with Sb$_2$O$_5$ in the raw mix from which the opacifier is either smelted or sintered, in which case the potassium nitrate or similar oxidizing agent may be omitted. Sodium nitrate may of course be substituted for potassium nitrate although the latter is preferred on account of its higher fusing temperature.

Opacifier A is characterized by the presence therein of minor amounts of zirconium and is in this respect an improvement over the remainder of the opacifiers given although due to the presence of the zirconium is slightly more expensive. When, however, an opacifier of superior properties is desired where the expense is not a material factor, we prefer to employ the addition of zirconium in the proportions stated.

As previously indicated, a porcelain enamel containing a concentration of opacifier of the character above described in excess of that which can be practically secured by the addition of opacifier forming constituents to the raw mix fed to the smelter from which the frit is produced, is also part of our invention. As previously indicated, the opacifiers as such, above identified, may be added to the frit as a mill addition in amounts of from about 2% to about 20%. As a matter of fact the opacifiers of our invention may be employed in considerably higher percentage up to, for example, 40% in a clear glass. However, it is more practical to achieve a certain amount of opacity in the frit by additions to the raw mix fed to the smelter and to then achieve the full desired opacity by the employment of the specified amounts of the opacifiers defined herein as mill additions. The amount of opacifier produced in the frit by raw mix additions in the smelter may thus be expressed in terms of the amount of antimony oxide employed. It will generally be found practical to employ antimony oxide in amounts up to 10% and even as high as 15% in the raw mix which is fed to the smelter in the production of the frit along with amounts of the other opacifier forming constituents as given in Tables A to C necessary to satisfy the amount of antimony oxide used in accordance with the molecular ratios given in the tables set out hereinabove.

The present invention is an extension of the teachings of our co-pending application Serial No. 241,632 filed November 21, 1938 and wherever reference is made herein to an enamel composition or a clear glass to which the opacifier is to be added reference may be had to such co-pending application for formulas of such enamel or glass.

Likewise, as pointed out in our previously filed application, the opacifiers of the present invention may be most advantageously employed in antimony-bearing frits. The usefulness of the opacifiers disclosed herein may also be developed to the fullest extent by fine grinding the slip in which the same are included, all in accordance with the principles disclosed in our said prior application.

Other modes of applying the principle of our invention may be employed instead of the one explained, change being made as regards the product and method herein disclosed, provided the step or steps stated by any of the following claims or the equivalent of such stated step or steps be employed.

We, therefore, particularly point out and distinctly claim as our invention:

1. An opacifier for use in porcelain enamels comprising a pre-formed product having the general formula:

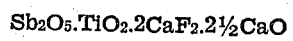

2. An opacifier for use in porcelain enamels comprising a pre-formed product having the general formula:

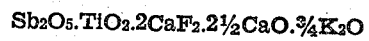

3. An opacifier for use in porcelain enamels comprising a pre-formed product having the general formula:

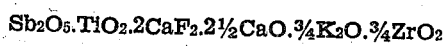

4. A porcelain enamel slip comprising a liquid suspension of finely divided frit containing a substantial amount up to about 15% of antimony oxide and such suspension also including from about 2% to about 20% of an opacifier having a general formula according to claim 2.

5. An opacifier for porcelain enamels and the like comprising the finely divided product resulting from sintering the following mixture:

|   | Per cent |
|---|---|
| Whiting (CaCO$_3$) | 24.5 |
| Fluorspar (CaF$_2$) | 15.2 |
| Titania (TiO$_2$) | 7.9 |
| Antimony oxide (Sb$_2$O$_3$) | 28.5 |
| Potassium nitrate (KNO$_3$) | 14.9 |
| Zirconium oxide (ZrO$_2$) | 9.0 |

6. An opacifier for porcelain enamels and the like comprising the finely divided product resulting from sintering the following mixture:

| | Per cent |
|---|---|
| Whiting (CaCO$_3$) | 26.8 |
| Fluorspar (CaF$_2$) | 16.8 |
| Titania (TiO$_2$) | 8.6 |
| Antimony oxide (Sb$_2$O$_3$) | 31.4 |
| Potassium nitrate (KNO$_3$) | 16.4 |

7. An opacifier for porcelain enamels and the like comprising the finely divided product resulting from sintering the following mixture:

| | Per cent |
|---|---|
| Whiting (CaCO$_3$) | 30.6 |
| Fluorspar (CaF$_2$) | 19.2 |
| Titania (TiO$_2$) | 9.8 |
| Antimony pentoxide (Sb$_2$O$_5$) | 40.5 |

GLENN H. McINTYRE.
MONROE J. BAHNSEN.
BENJAMIN J. SWEO.